(12) United States Patent
Neu et al.

(10) Patent No.: US 6,277,174 B1
(45) Date of Patent: Aug. 21, 2001

(54) LOW PRESSURE RATIO VPSA PLANT TUNING AND BALANCING SYSTEM

(75) Inventors: Bernard Thomas Neu, Lancaster; James Smolarek, Boston; Michael Kenneth Rogan, Hamburg, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/479,643

(22) Filed: Jan. 7, 2000

(51) Int. Cl.⁷ .................................................. B01D 53/047
(52) U.S. Cl. ..................... 95/12; 95/22; 95/100; 95/138; 96/111; 96/113; 96/130
(58) Field of Search ................................ 95/8, 11, 12, 19, 95/21, 96–106, 130, 138; 96/111, 113, 114, 130

(56) References Cited

U.S. PATENT DOCUMENTS

| 3,703,068 | * | 11/1972 | Wagner | 95/11 |
|---|---|---|---|---|
| 4,140,495 | * | 2/1979 | Pietruszewski et al. | 96/113 X |
| 4,472,177 | * | 9/1984 | Sicar | 95/11 |
| 4,693,730 | | 9/1987 | Miller et al. | 55/18 |
| 4,725,293 | * | 2/1988 | Gunderson | 55/162 |
| 4,747,853 | * | 5/1988 | Haslett | 55/21 |
| 4,927,434 | * | 5/1990 | Cordes et al. | 96/113 X |
| 5,258,056 | * | 11/1993 | Shirley et al. | 95/22 |
| 5,407,465 | | 4/1995 | Schaub et al. | 95/14 |
| 5,486,226 | * | 1/1996 | Ross et al. | 95/11 |
| 5,529,607 | | 6/1996 | Tan | 95/12 |
| 5,733,359 | * | 3/1998 | Doong et al. | 95/8 |
| 5,917,135 | * | 6/1999 | Michaels et al. | 95/11 |
| 5,989,313 | * | 11/1999 | Mize | 95/11 X |
| 6,063,169 | * | 5/2000 | Cramer et al. | 95/21 X |
| 6,077,331 | * | 6/2000 | Phillips | 95/12 |

FOREIGN PATENT DOCUMENTS

| 3006836 | * | 9/1981 | (DE) | 95/11 |
|---|---|---|---|---|
| 0435275A | * | 11/1988 | (SU) | 95/8 |
| 62-017008A | * | 11/1988 | (JP) | 95/11 |

* cited by examiner

Primary Examiner—Robert H. Spitzer
(74) Attorney, Agent, or Firm—Robert J. Follett

(57) ABSTRACT

The invention maintains a nearly constant cycle pressure ratio along with a balancing of the adsorbent vessel effluents in a pressure swing adsorption process. The invention monitors cycle pressure ratio and subsequently alters the cycle step times and flows to sustain its value, thereby maximizing plant performance and avoiding unnecessary shutdowns. Maintaining a nearly constant pressure ratio assures that the plant production is optimized and that power consumption is minimized. The balancing of the adsorbent vessel effluents, using the corresponding waste purities, is used to further improve plant production.

21 Claims, 5 Drawing Sheets

Typical VPSA Cycle Step Diagram

Step #1  Raising pressure feed with overlap equalization
Step #2  Raising pressure feed with overlap product pressurization
Step #3  Raising pressure feed Step #4  Constant pressure feed with product make
Step #5  Constant pressure feed with make product and purge
Step #6  Falling pressure equalization Step #7  Falling pressure evacuation with overlap equalization
Step #8  Falling pressure evacuation Step #9  Falling pressure evacuation Step #10  Falling pressure evacuation Step #11  Constant pressure evacuation with oxygen purge
Step #12  Raising pressure evacuation with overlap equalization

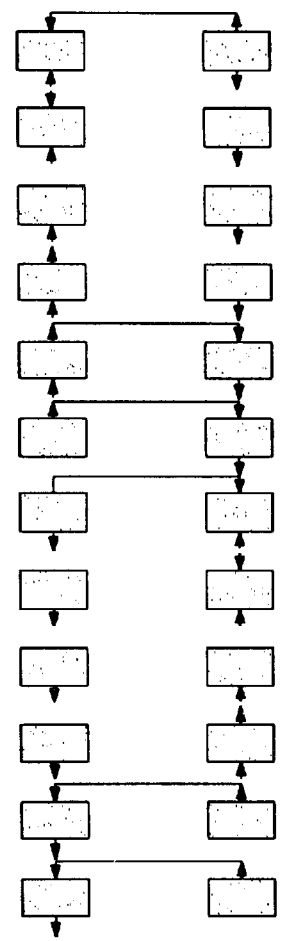

FIG. IA

Typical VPSA Conditions

| Step description | Step time seconds | Start Pressure | End Pressure |
|---|---|---|---|
| Step #1 Raising pressure feed with overlap equalization | 2.0 | 8.85 | 13.8 |
| Step #2 Raising pressure feed with overlap product pressurization | 3.0 | 13.8 | 18.2 |
| Step #3 Raising pressure feed | 3.0 | 18.2 | 20.8 |
| Step #4 Constant pressure feed with product make | 1.0 | 20.8 | 20.8 |
| Step #5 Constant pressure feed with make product/purge | 2.5 | 20.8 | 20.9 |
| Step #6 Falling pressure equalization | 1.5 | 21 | 17.7 |
| ***half cycle*** | | | |
| Step #7 Falling pressure evacuation with overlap equalization | 2.0 | 17.7 | 12.3 |
| Step #8	
 Falling pressure evacuation | 7.0 | 12.3 | 7.45 |
| Step #11 Constant pressure evacuation with oxygen purge | 2.5 | 7.45 | 7.45 |
| Step #12 Raising pressure evacuation with overlap equalization | 1.5 | 7.45 | 8.65 |

FIG. 1B

LOW PRESSURE RATIO VPSA PLANT TUNING AND BALANCING SYSTEM

FIELD OF THE INVENTION

This invention relates to control of a pressure swing gas separation process and, more particularly, to a method for adjusting adsorption/desorption step times and vessel reflux step times and flows, based on observed pressures and purities, to maintain vessel pressures slightly below or at predetermined values in order to optimize and achieve maximum production.

BACKGROUND OF THE INVENTION

Cost competitive PSA (Pressure Swing Adsorption) system designs rely on high utilization of well matched system components including feed and vacuum blowers, vessel bed and adsorbents, valves, and other equipment. Safe, consistent, efficient use and control of this equipment is critical. To maintain control of this highly transient process, plants are equipped with Programmable Logic Controllers (PLCs) and computers running control and monitoring software. Recent development of radial flow adsorbers with short bed lengths, advanced adsorbents with high adsorption rates, and other system enhancements have acted to shorten cycle times, further adding increased process sensitivity to the transient nature of PSA operations.

Further, development of low pressure ratio VPSA cycles has facilitated a switch to single stage rotary lobe vacuum pumps. To be effective these pumps must be carefully sized to match other system components, such as bed volume and feed air blowers. These vacuum blowers are operated at pressure differentials that are near their maximums from a mechanical standpoint, and aerodynamically at a point where efficiency would fall sharply with increased vacuum levels.

In theory, once proper operating pressures are established for a system they do not need to be adjusted. A problem is that variations such as ambient temperature and pressure, control valve positioning, plant tuning parameters, operating temperature, cooling loops, blower and compressor mechanical wear and valve leaks will effect these pressure levels, and at times cause off-peak operation by forcing system components to operate away from their design points. In extreme cases, even equipment shutdown is possible. Therefore, for safe and efficient operation, the overall pressure levels of the system must be carefully monitored during plant operation, and when required, adjusted to nearly match desired values.

In cases where more than one adsorption vessel is utilized in a system, another problem may arise. This problem stems from difficulty in matching individual operation of the vessels in a manner which yields optimum system performance as measured by minimum unit power, minimum product purity variation, maximum production, etc. As is the case with overall system pressure level control, bed to bed balancing is required because disturbances enter the system and at times act to change system stability. Such disturbances can be introduced by variations in ambient temperature, ambient pressure, process equipment, process valve positioning, process valve response time, plant computer control functions, and others. Effects of these disturbances can be minimized by monitoring key process parameters, and then by making adjustments via the process control system to restore the system to near design operation. This bed to bed balance is required, in addition to the overall pressure level control mentioned above.

U.S. Pat. No. 4,747,853 to Haslett et al. describes a method of over pressurization control, for cases of valve failure, that utilizes a pressure sensing device, a flow restricting orifice and a normally open valve. If the pressure sensing unit detects unacceptable pressures, a signal is sent to the normally open valve, causing it to close. The downstream system is thus protected from the higher pressure in a manner similar to commercially available relief valves or bursting disks.

Bed balancing/tuning is described in U.S. Pat. No. 5,407,465 to Schaub, et.al. This patent recognizes a need to maintain bed to bed balance and concludes that a balanced system will operate with each bed having a similar axial temperature profile. If a disturbance enters the system, the axial temperature profile changes for each bed, providing an indicator of the unbalance. A plant control computer is utilized to monitor bed temperatures and to make adjustments to equalization and purge flows entering and exiting each vessel in a manner designed to restore similar temperature profiles to each bed.

U.S. Pat. No. 5,529,607 to Ziming Tan indicates that maximum $O_2$ concentration measured in purge gas effluent from individual beds being operated out of phase in a cyclic PSA process, can be monitored. Then the absolute difference of the concentrations can be determined and adjustments made to the purge process step time of each bed in a manner which reduces the absolute value of the concentration difference.

U.S. Pat. No. 5,486,226 to Ross et al. uses an oxygen analyzer to measure impurity in a carbon PSA designed to make $N_2$. If the $O_2$ impurity rises above acceptable limits, flow of product quality gas is initiated from a surge tank into the adsorption vessels in a manner to restore product purity. This provides a means of rapid restart after an outage or other upset.

U.S. Pat. No. 5,258,056 to Shirley et al. describes a method for controlling output production from a plant by measuring a change in product demand and then adjusting the feed airflow to compensate for the change in product demand. Feed airflow is adjusted in such a manner as to maintain a constant product purity. The system controls feed air for both turndown capacity control and purity control.

U.S. Pat. No. 4,725,293 to Gunderson describes a system for control of impurity levels in a product stream by monitoring purity levels of the product stream and then by adjusting feed air flow in a manner to maintain desire product purity.

U.S. Pat. No. 4,693,730 to Miller et al. proposes a method for controlling the purity of a gas component in the product stream of a PSA. The concentration of impurity is monitored in a co-current depressurization, or equalization gas to determine if there is an upset condition present. If a problem is detected, then the process is adjusted. The main actions that can be undertaken to correct the purity problem are:

a) Change the adsorption step time to control the position of the leading edge of the mass transfer front.

b) Change the end point of the final co-current depressurization step so that break through of the mass transfer front does not occur.

c) Increase the amount of purge gas to each vessel.

In essence the Miller et al. system monitors purity at a time in the cycle when it is changing most quickly and when upsets are most easily detected. It is thus possible to detect events before they have a chance to fully propagate and show in the product purity.

SUMMARY OF THE INVENTION

The invention monitors system pressures, sends the monitored data to a PLC which, based on control logic, adjusts the process step times in a manner to keep the process operating safely at desired optimum pressures. The invention controls bottom pressures independently from top pressures, thereby providing a means to optimize both a feed blower and vacuum blower somewhat independently of each other. Since the vacuum blower is a single stage machine, maintaining an optimized cycle pressure ratio is more difficult. This is due to the fact that a larger volume of air is being processed at an elevated suction pressure (when compared to a previously utilized two stage vacuum blower). The prior art has attempted to control the adsorption and desorption pressures to fixed, discrete levels. Adjustments made to operate at these discrete levels have led to process inefficiencies in that adjustments made to one piece of equipment would affect another due to the fact of coupling therebetween via the process flow. A key feature of this invention is that the individual step times and internal reflux flows within a cycle are simultaneously adjusted. These adjustments are made in a manner that operates the cycle at a pressure ratio near the desired pressure ratio, with both top adsorption and bottom desorption pressures at constantly changing levels that are optimized for the given process and equipment operating conditions.

In PSA systems with more than one adsorption vessel, additional control within the overall pressure level optimization is required as it is necessary to maintain nearly balanced vessel to vessel performance. Balanced PSA vessel performance is achieved when the outlet streams from each of the adsorption vessels operate at similar levels of oxygen purity. Ideally, as each successive vessel in the system undergoes the main process steps from adsorption through desorption, key process indicators such as internal vessel temperature, vessel pressure level, effluent gas composition, step time length, and others are identical in amplitude and frequency. In other words, there is no variation in the operation of the vessels. Product gas flowing from the system is consistent in purity regardless of the on-stream vessel producing it.

Balanced vessel operation maximizes output from the entire system, further reducing overall production costs. To achieve such optimizations, the prior art has utilized purity, pressure, or temperature measurements as a means of detecting an unbalance and then made adjustments to the process in a manner to restore balance. This invention equalizes flows into and out of the vessels by monitoring of the individual vessel effluents (waste stream) during each entire evacuation half cycle and logging the minimum oxygen concentration found during this period of time. Then, the equalization flows (vessel effluent that is transferred from the bed currently in the adsorption phase of the cycle to the bed that is currently desorbing) are adjusted accordingly so as to achieve similar $O_2$ concentration in the vessel waste streams.

A key feature of this invention is that it systematically adjusts individual cycle step times (feed time, purge time, equalization time) to keep the overall system at its optimum pressure levels. Changing step times for any purpose, without specifically choosing the times, to maintain system pressure and overall reflux requirements will result in non-optimum performance. The invention has no need to precisely time the recording of $O_2$ concentration. It simply monitors for the minimum purity for each cycle and then compares them.

The prior art has also attempted to record pressure from each vessel and then to make comparisons at fixed intervals or, most typically, step times. This has been shown to be ineffective as temperature change and inherent adsorptive material differences between the beds can lead to situations where the pressure in each bed matches, but the beds themselves are significantly out of tune and the production is less than optimum. Measurement of bed differential pressure (the difference between the top of the bed and the bottom of the bed pressure) taken during the equalization step for each vessel has also been used for process tuning. Field testing of this procedure indicates that it does not produce the same effective results as matching minimum waste stream purity.

Maintaining an optimized cycle pressure ratio near the design point, along with a balancing of the adsorbent vessel effluent, provides a significant economic advantage. By monitoring cycle pressures and subsequently altering the cycle step times to sustain an optimum value, plant performance is maximized and unnecessary shutdowns are avoided. Also, maintaining a system optimized pressure ratio assures that the plant production is optimized and the power consumption is minimized. The balancing of the adsorbent vessel effluents, using the corresponding waste purities, leads to significant improvement in plant production.

BRIEF DESCRIPTION OF THE DRAWINGS

FIG. 1A is a VPSA Cycle Step Diagram.

FIG. 1B is a chart listing VPSA Process Conditions and Inner Channel Pressures.

DETAILED DESCRIPTION OF THE PREFERRED EMBODIMENT

The invention, as described below, controls a VPSA system in order to both minimize power consumption and to maintain continuous and profitable operation of the system. Such control is achieved by maintaining the cycle pressure ratio (Pmax/Pmin) near to a design level while maximizing the plant production. Control is achieved by manipulation of the cycle step times and Adjustment of equalization and purge flows. These actions help in maintaining a cycle pressure ratio near to the design while maximizing production by balancing the composition of the streams entering and leaving each adsorbent vessel.

The overall cycle time is manipulated by changing the individual step times (purge step, equalization step and overall feed time) to produce the desired control of the cycle pressure ratio. The production from each of the adsorbent vessels is balanced by monitoring the composition of the vessel effluent streams. By balancing the adsorbent effluent, the efficiency and production of the plant is increased. The vessel effluent balancing is achieved by adjusting the equalization and purge gas flows.

Figure 1C:
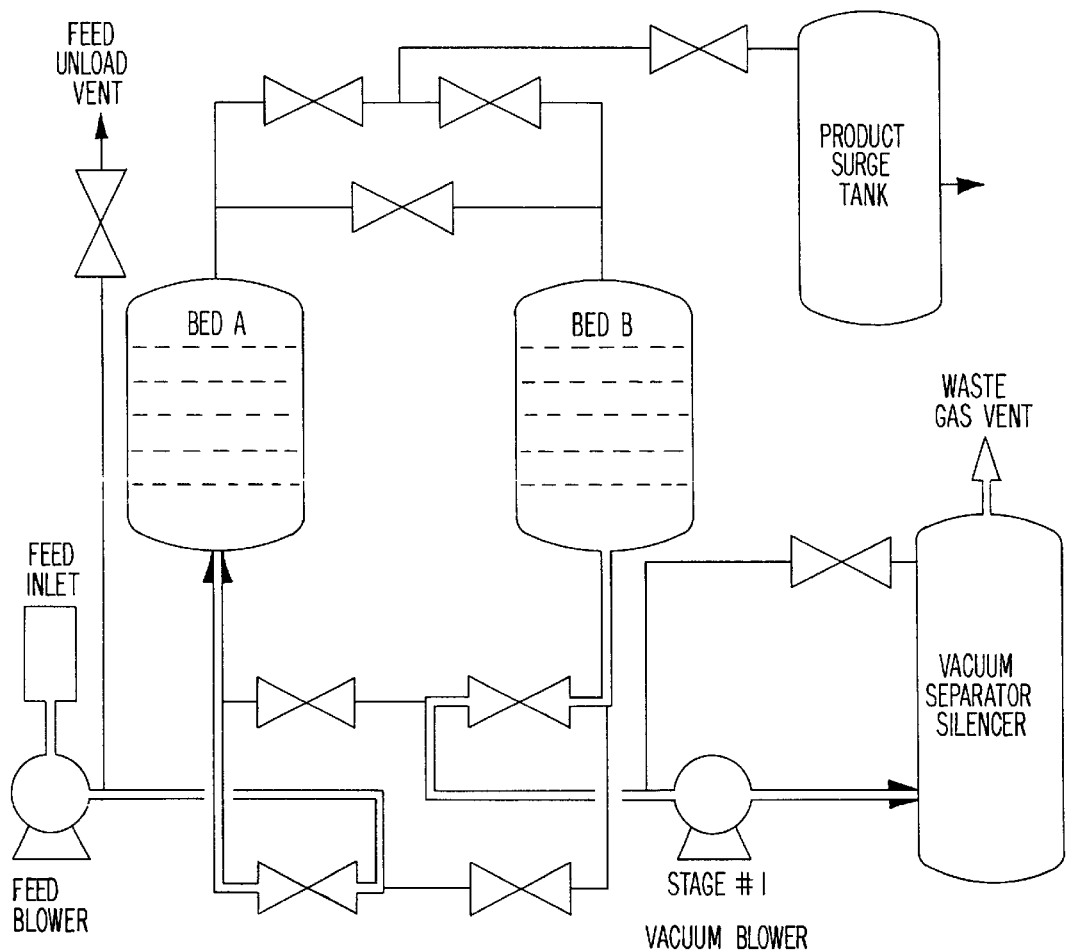
FIG. 1C is a VPSA Equipment Diagram for carrying out the invention.

The low pressure ratio PPPOE (Product Pressurization with Purge and Overlap Equalization) cycle for a two bed VPSA system consists of 12 steps and utilizes a vacuum blower in a continuous manner. Typically, this cycle produces oxygen gas at 90–94% purity from air and operates with a short cycle time and a low bed size factor. The descriptions of the cycle steps below are for Bed "A". Beds A and B undergo the exact same steps, but 180 degrees out of phase. FIGS. 1A (VPSA Cycle Step Diagram), 1B (VPSA Process Conditions and Inner Channel Pressures) and 1C (VPSA Equipment Diagram) aid in an understanding of the process steps.

Step 1: Rising Pressure Feed with Overlap Equalization: The feed blower is loaded during this step. Bed A (for example) is simultaneously pressurized from the bottom with feed air and from the top with equalization gas delivered from the depressurizing vessel (i.e., Bed B).

Step 2: Rising Pressure Feed with Overlap Product Pressurization: High purity product is now added to the top of Bed A from the oxygen surge tank while feed air is supplied by the feed blower. This step is used to sharpen the adsorption front while simultaneously increasing the pressure in the bed.

Step 3: Rising Pressure Feed: Feed continues to enter the Bed A via the feed blower. Bed A is building in pressure moving towards a set pressure before the process is permitted to make product. The pressure at the end of the step is as close as possible to the maximum adsorption pressure for the given product tank volume and pressure control system.

Step 4: Constant Pressure Feed with Product Make: The pressure in Bed A is held relatively constant during this step by matching feed air into the vessel with product withdrawal from the top of the vessel. The product gas is delivered to the oxygen surge tank.

Step 5: Constant Pressure Feed with Make Product and Purge: Feed air flow into the bottom of the Bed A vessel continues while the oxygen product is sent to the product surge tank and to the depressurized vessel (Bed B) as oxygen purge gas. Flows are matched to keep the vessel pressure nearly constant. The purity of the oxygen product during this step remains relatively constant and the step is terminated before the purity front breaks through the top of Bed A.

Step 6: Falling Pressure Equalization: During this step the flow of feed gas to the Bed A vessel is discontinued by closing the feed valve. The feed air blower is unloaded by opening a vent located on the discharge side of the system. The lower purity gas remaining in the top of the pressurized Bed A is transferred to the depressurized vessel (Bed B), thus nearly equalizing the pressure in the two vessels. This is done as a process enhancement as it allows for the recovery of pressure energy and relatively high $O_2$ concentration gas that is contained in the top of the vessel.

Step 7: Falling Pressure Evacuation with Overlap Equalization: The removal of waste nitrogen by the vacuum blower is initiated during this step while the Bed A vessel is simultaneously depressurized from the top by the equalization falling flow to the raising pressure adsorption vessel (Bed B).

Steps 8, 9 and 10: Falling Pressure Evacuation: These three steps are a continuation of the evacuation period. Waste nitrogen is removed from the bottom of the Bed A vessel while there is no flow exiting or entering the top of the vessel.

Step 11: Constant Pressure Evacuation with Oxygen Purge: The vacuum blower continues to remove nitrogen from the bottom of the Bed A vessel while oxygen purge gas is added to the top of the vessel. The pressure remains relatively constant during this step due to the fact that the oxygen purge flow is controlled equal to the evacuation flow.

Step 12: Rising Pressure Equalization: The vacuum blower continues to evacuate nitrogen while equalization oxygen from the pressurized bed (Bed B) is fed into the top of the depressurized vessel (Bed A). The pressure in Bed A rises during this step because the equalization flow into the vessel is greater than the evacuation flow out of the vessel. The feed blower which was feeding Bed B is unloaded during this step.

The pressure ratio for the cycle is calculated by dividing the maximum feed blower discharge pressure (occurring at the end of step 5 for Bed A; step 11 for Bed B) by the minimum vacuum blower suction pressure (occurring at the end of step 11 for Bed A; step 5 for Bed B).

The standard pressure ratio VPSA cycle utilizes a two-stage vacuum blower and develops a large differential pressure across the vacuum blower assembly (vacuum blower suction to discharge, differential pressure ~10.5 psid). The low pressure ratio VPSA cycle consists of only a single stage vacuum blower and a considerably smaller differential pressure (~8 psid) is achieved across the vacuum blower. The resulting pressure ratio is considerably smaller than with a two stage vacuum blower assembly (~3 vs. ~5).

The single stage vacuum blowers used on VPSA plants can achieve a maximum differential pressure of ~8.5 psid. In order for a standard pressure ratio process to achieve it's necessary differential pressure, two vacuum blowers must be used. But, by incorporating the low pressure ratio cycle, costs are lessened since only one vacuum blower is needed. Also, the process pressure ratio (which is intrinsically tied into the vacuum suction differential pressure) needs to be accurately controlled in order to enable the use of a single vacuum blower.

Tuning to Maintain Pressure Ratio

Figure 2:
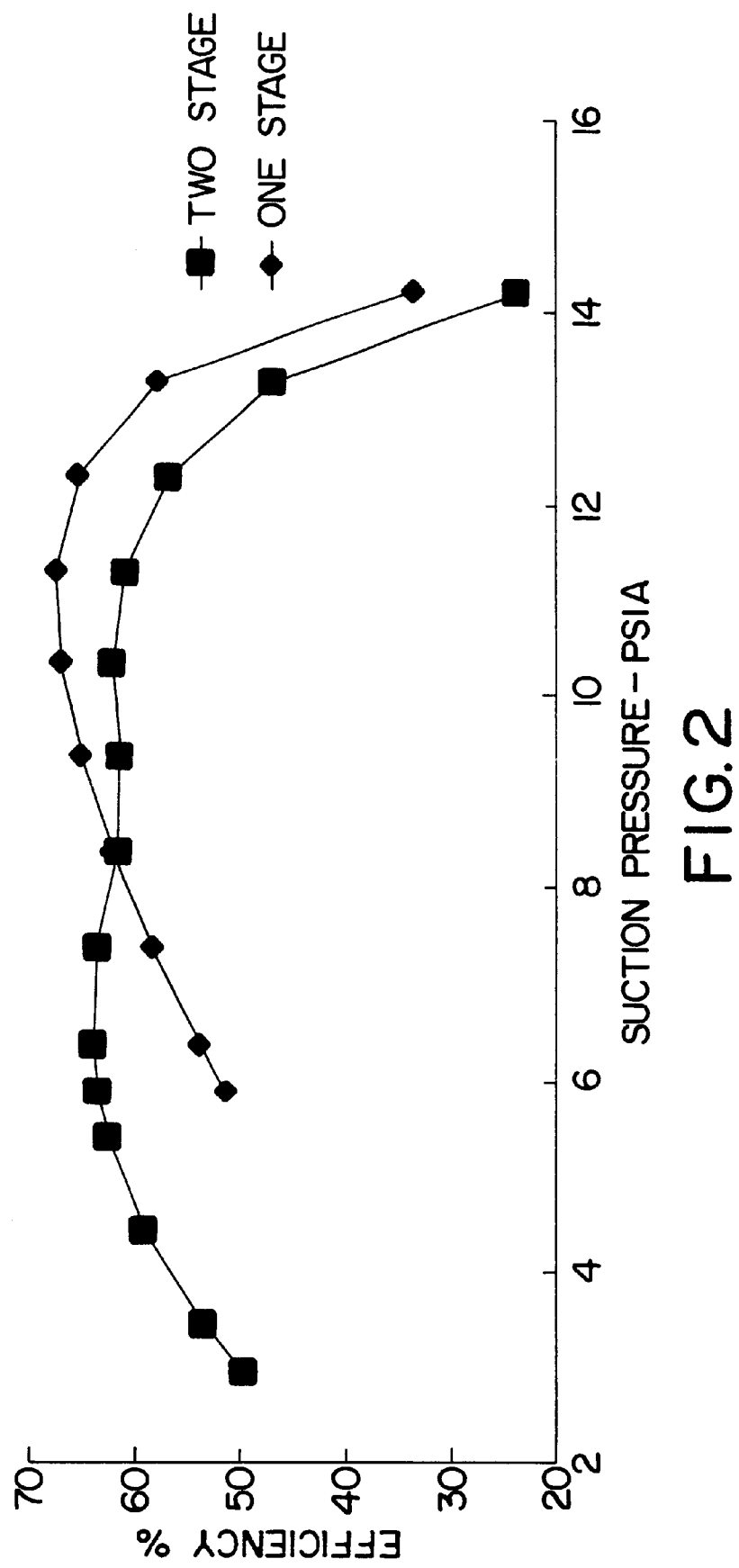
FIG. 2 displays a graph of Vacuum Blower Efficiency vs. Vacuum Blower Suction Pressure for both a single and a two-stage vacuum blower assembly.

Pressure control is critical with low pressure ratio VPSA cycles. The invention employs a feed blower and a single stage vacuum blower. The vacuum blower operates at a differential pressure near its design maximum and at pressure levels where efficiency is noticeably decreased with increasing vacuum levels. FIG. 2 displays a graph of Vacuum Blower Efficiency vs. Vacuum Blower Suction Pressure for both a single and a two-stage vacuum blower assembly. As the suction pressure is reduced from a suction pressure of 8 psia (vacuum blower differential pressure of ~6.5 psid) down to 6 psia (~8.5 psid), the pressure ratio is increasing while the efficiency of the machine is decreasing. With a machine design suction pressure limit of approximately 6 psia, as the suction pressure falls closer to this limit, the efficiency falls rapidly. It is thus important to maintain the suction pressure at a level where the vacuum efficiency level is tolerable and the plant production is optimized using the pressure ratio. Changes in ambient conditions, equipment selection, tuning parameters, operating temperatures, cooling systems and valve leaks will all affect operating pressure levels and overall system operation.

For fixed conditions(absence of any disturbance), PSA process pressures will remain constant with advancing time. The actual values that they reach each cycle will depend on the system gas storage capacity, the equipment utilized in the system, and individual step times.

In general, the feed air machine adds gas to the system, increasing its pressure to some high value, and the vacuum blower removes gas from the system to some low value. As long as this balance is maintained, the process pressures will repeat with some average pressure. This average pressure is defined as the top and bottom pressure summed and divided by two. If more gas flows out of than into the system; top, bottom, and average pressures will fall or vise versa. Likewise, lengthening of the cycle will increase top and reduce bottom pressures. Shortening the cycle will reduce top and increase bottom pressures. This is because more total flow is entering or exiting a fixed system but in a proportional manner.

The average will change somewhat for each case, but its movement will be much smaller relative to the top and bottom pressure movement. Thus it is possible to change the pressure range through which the cycle operates by lengthening or shortening step times. In fact, control of at least one of the top or bottom pressures can be maintained by monitoring the pressures and changing the cycle time to maintain the pressures within tolerance or below max/min values.

In actual operation, additional factors are encountered. These include flows internal to the system such as equalization and purge, and product flow. The amount of each of these flows to and from each vessel in the system will effect vessel pressures. These flows are controlled by step time and/or control valve positions. Their step times can be adjusted within a fixed overall cycle time. Their valve position can be controlled to change flow for a fixed step time. Additionally, there is an equalization control valve for each individual vessel making it possible to have different flows for each vessel for a given step time. These added control variables make it possible to adjust the process to desired pressure levels within the top and bottom pressure level control mentioned above, and since they effect vessel to vessel operation they can also be used to maintain proper balance between vessels.

Cycle step times for steps 6 and 12, as described below, are of particular importance when effecting pressure levels as the feed blower is unloaded during those steps while the vacuum pump continues to operate. Additionally, there is internal equalization flow from vessel to vessel. Thus both flows into and out of the system, as well as flows internal to the system, can be modulated during the step so as to provide maximum effect on system pressures.

The typical vacuum and feed blowers are selected to provide a nominal 6–7.5 psia bottom pressure and the 21–23 psia top pressure with the desired intermediate equalization, purge, overlap equalization and product pressurization steps. Pilot and field testing have demonstrated that several reflux combinations consisting of various amounts of equalization, overlap equalization and purge can be utilized to obtain a particular desired operating performance. Then by varying the amount of equalization to higher and lower level, with a subsequent lower or higher purge and overlap equalization rate, respectively, a range in top and bottom pressures can be achieved without altering the displacement of the blowers.

Thus, the bottom pressure can be raised or lowered while maintaining a nearly constant top pressure. Additionally, the top pressure can also be raised or lowered while maintaining a nearly constant bottom pressure by utilizing this concept simultaneously with longer or shorter adsorption steps.

Tuning to Maintain Balance Between Adsorbent Vessel Effluent

Earlier multiple bed PSA systems have employed bed temperatures and pressure levels to maintain bed balancing. The use of radial beds with advanced high rate adsorbents, small beads, small bed size factors and short bed lengths complicates this tuning. Future VPSA systems will have increasingly sharper adsorption fronts with shorter beds, and the effects of poor balancing will become progressively more detrimental to plant performance.

For a two bed $O_2$ VPSA, a key measure of bed balance can be determined by monitoring the $O_2$ concentration of the effluent for each vessel during its regeneration step. This can be accomplished with an analyzer at the outlet of each bed or, preferably, with a single analyzer in the common piping just downstream of the waste switching valves. By locating the sensor directly in the flow channel leaving the vessel, it is possible to eliminate a sample pump that would be required to draw flow from the evacuate channel. When the system detects an unbalance, the equalization flows are adjusted in a manner which restores the balance. The flow is varied by sending a computer calculated setpoint to the automatic valve controlling equalization flows. A higher set point to the valve will allow more gas to flow. Each bed has a separate control valve for equalization thus different flows are possible for each bed.

Only relative concentration differences are required to provide balancing. Testing has shown that the beds are best balanced by monitoring the effluent concentration throughout the entire desorption step and determining the minimum $O_2$ concentration or shift limit for each bed. These values are compared for each bed and balance adjustments are made in accord with their differentials Testing further shows that balanced waste breakthrough levels will result in balanced top product breakthrough levels and achieve optimized production for the overall cycle conditions. The logic will increase equalization rate to the bed with the lower waste oxygen purity and simultaneously decrease the equalization to the bed with the higher waste purity.

Figure 3:
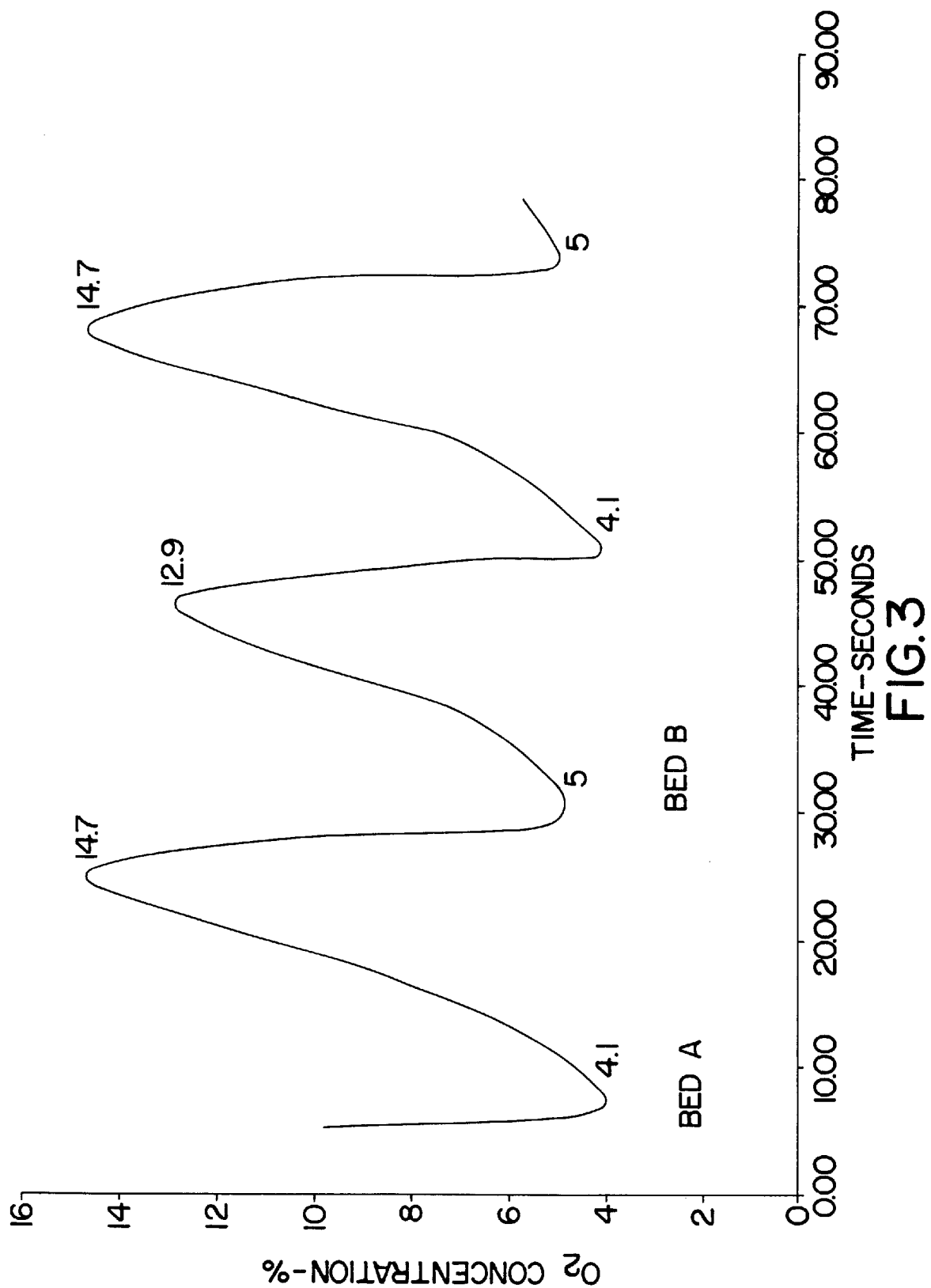
FIG. 3 illustrates a waste (effluent) $O_2$ trace collected in the field.

FIG. 3 illustrates a waste $O_2$ trace collected in the field. Note that bed "A" is running with a minimum waste purity of 4.1% $O_2$ and bed "B" is running with a minimum waste purity of 5.0% $O_2$. For this case, the proper adjustment is to increase equalization flow rate exiting Bed B and entering Bed A. The flowrate adjustments from bed to bed are done cautiously, changing the automatic control valve settings by only a few percent at a time. If these flow rates are drastically changed, the plant will become unstable and the beds will never reach a balanced state.

A tuned plant will occur when each of the two beds has the same minimum value or when the absolute value of their difference is near zero. FIG. 3 illustrates the logic used during the bed balancing:

| Scenario | Bed Balancing Result |
| --- | --- |
| Bed A Waste Purity > Bed B Waste Purity | Increase Equalization Flow From Bed A to Bed B |
| Bed A Waste Purity < Bed B Waste Purity | Increase Equalization Flow From Bed B to Bed A |
| Bed A Waste Purity = Bed B Waste Purity | Beds Are Balanced |

For a single stage vacuum pump system, tuning is much more critical than a two stage vacuum pump system. The performance of the adsorbent used in the VPSA oxygen system consistently improves as the overall pressure ratio increases (caused by decreasing vacuum suction pressure). Since the performance of the adsorbent used in the VPSA process is extremely sensitive to the overall pressure ratio of the process, maximizing the plant performance for a single stage vacuum pump system is important. Unbalance in a low pressure ratio process is considerably more detrimental to system capacity than in a two stage system.

Experimental Data

Table 1 displays process data collected from the field and a pilot plant. The data demonstrates the various reflux steps and their effect on VPSA operating parameters:

TABLE 1

| Data Set Descriptor | Dataset 1 | FIELD DATA Dataset 2 | Dataset 3 | Dataset 4 | LAB DATA |
|---|---|---|---|---|---|
| Purge Step Time - sec | 3.0 | 3.5 | 4.0 | 4.5 | 5.0 |
| Equalization Step Time - sec | 2.5 | 2.0 | 1.75 | 1.5 | 1.5 |
| Bed Top Pressure - PSIA | 22.2 | 22.2 | 22.2 | 22.1 | 23.7 |
| Bed Bottom Pressure - PSIA | 5.8 | 6.3 | 6.4 | 6.6 | 7.1 |
| Plant Recovery - Percent | 58.6 | 56.5 | 55.8 | 54.6 | 53.9 |
| Product Flow Rate - STPD | 167.7 | 166.7 | 167.2 | 166.0 | — |
| Plant Unit Power - kw/STPD | 8.65 | 8.65 | 8.70 | 8.65 | — |
| Pressure Ratio | 3.85 | 3.55 | 3.45 | 3.35 | 3.35 |

This data shows that changes to the reflux steps (purge and equalization steps; with varied bottom pressure from 5.8 to 7.1 PSIA, with a corresponding pressure ratio change from 3.85 to 3.35. The data demonstrates the invention's ability to affect the bottom pressure level while holding the same top pressure. The data also shows that the overall plant capacity and unit power consumption was relatively constant for all field cases conditions. Note that these tests were conducted with a 2-stage vacuum pump. With a lower bottom pressure of 5.8 PSIA, a higher unit power would have resulted if a single stage vacuum pump were used.

Vacuum Blower Efficiency

A plot displaying the efficiency of the Vacuum Blower Assembly (Single and Two Stage) vs. the Vacuum Suction Pressure are shown in FIG. 2. The graph of FIG. 2 displays how the efficiency of the Vacuum Blower Assembly changes with an increase in differential pressure (due to a decrease in suction pressure) across the assembly. The graph shows that for the 2-stage Vacuum Assembly, the efficiency remains relatively constant for a large segment of the graph and does not begin to decrease significantly until the suction pressure reaches ~5 psia.

The single stage machine, although it has a higher efficiency at the elevated suction pressures, begins to lose efficiency at ~10 psia. The single stage blower efficiency becomes worse than the two stage machine at ~8 psia and as the suction pressure drops the efficiency continues to rapidly decrease. The two stage machine is much more forgiving as it loses suction pressure. The plot shows that accurate control of the vacuum blower suction pressure along with the overall pressure ratio is important when optimizing the performance of the low pressure ratio PPPOE cycle.

Typical Tuning Application Example

A given system is tuned for the following conditions: 6.5 PSIA bottom pressure, 21.5 PSIA top pressure, 4 second purge step, 2 second equalization step, 2 second overlap equalization step, 30 second cycle time, and operation at 80 F. ambient.

A disturbance enters the system in some form such as ambient temperature variation, customer demand fluctuation, or other. For this example the temperature is lowered to 30 Deg F. Under these conditions a fixed displacement feed air blower will deliver approximately 10% more feed air on a mass basis and unless the cycle time is altered, the increase in mass flow will act to change the plant top pressure consistent with the new temperature conditions.

If the adsorption step time is reduced, the top pressure can be maintained as is assumed in this example. The ambient temperature change will not significantly affect the vacuum pump and, as a result, the bottom pressure will move away from the desired value of 6.5 psia to a higher pressure.

One possible outcome of this scenario is that the ambient temperature effect on the feed blower, the new colder bed temperatures, and the adjusted adsorption time, interact in a way that causes the bottom pressure to rise above the desired 6.5 PSIA desired value. If this occurs, the bottom pressure can be restored to the optimized range without affecting the top pressure by shortening the purge step to ~3 seconds and increasing the equalization step to ~2.5 seconds with a ~1.5 second overlap step and a slightly longer adsorption step. The operation of the system will once again be near the desired conditions with the top and bottom pressure at 21.5 psia and 6.5 psia respectively.

Likewise, if the bottom pressure is too low, the purge step can be increased to ~5 seconds with a shorter ~1.5 second equalization step and ~2 second overlap step and a slightly shorter adsorption step.

Two-Bed $O_2$ VPSA Cycle Pressure Autotuning Control System

Autotuning will be discussed with respect to the 12 step $O_2$ VPSA PPPOE cycle illustrated in FIG. 1b. The objective is to operate a VPSA/PSA system close to, but not exceeding upper and lower pressure limits throughout the range of plant operating conditions.

The top pressure setpoint is established just below the feed unload pressure (set from the manufacturer recommended maximum blower differential pressure). This is done to try to operate the system as closely as possible to the desired top pressure without having the feed blower vent open, thus unloading the feed air machine. Unloading the feed blower would cause the feed air to vent and result in a process inefficiency and control disturbance to the system.

The bottom pressure setpoint is established just above the vacuum alarm pressure (set on the VPSA system using the manufacturer recommended maximum blower differential pressure). This is done to prevent the vacuum pump from operating with too high a differential pressure which eventually can trip a shut down and cause the plant to shut down. It can also prevent the plant from running the vacuum blower at off design points from an efficiency standpoint.

The process cycle time is automatically adjusted to operate the system such that the higher of the two bed top pressures (one each for Bed A and Bed B) is at the top pressure setpoint or the lower of the two bottom pressures is at the bottom pressure setpoint.

Tuning to Maintain Pressure Ratio

The overall magnitude of pressure swing in the beds is increased or decreased by lengthening or shortening the period of time during which one bed is being fed (adsorption time) and the other is being evacuated. An increase in the pressure swing will occur when overall cycle time is extended because more gas is added to a "fixed" volume, thus raising the top pressure, and more gas is evacuated from the same "fixed" volume thus decreasing the bottom pressure.

Tuning to Balance Adsorption Vessel Effluent

The pressure profile is shifted to higher or lower pressures by changing the amount of time the feed blower is unloaded while the vacuum blower is loaded. This is accomplished by increasing or decreasing the equalization step time. This not only changes the relative amounts of feed and evacuation; it also changes the amount of equalization gas that passes from one bed to the other. This is offset by changing the purge step timer in the opposite direction. In other words, a reduction of equalization time (and flow) is accompanied by an increase in purge time (and flow). The end result is that an increase in equalization time and a decrease in purge time will lower the top and bottom cycle pressures. A decrease in equalization time and increase in purge time will raise the top and bottom pressures.

In application, tuning to maintain pressure ratio adjusts the cycle to get one of the two beds to reach the top or bottom pressure setpoint, while the other bed pressures stay between these setpoints. Tuning to balance the vessel effluent then adjusts the cycle to locate the top and bottom pressures between the setpoints. Acting in a loop, both tuning concepts will act to maintain the overall pressure ratio and stretch the cycle such that the feed and evacuation setpoints are each reached by one bed, with neither bed passing the setpoints.

Specifics

Top and bottom pressures are checked for each bed (at the start of equalization steps 6 and 12). These values are compared against the setpoints and the offsets are calculated.
Step 6:
  top offset bed A=top pressure setpoint−top pressure A
  bottom offset bed B=bottom pressure B−bottom pressure setpoint
Step 12:
  top offset bed B=top pressure setpoint−top pressure B
  bottom offset bed A=bottom pressure A−bottom pressure setpoint Feed Time Autotuning The largest in magnitude (absolute value) of all four offsets is used as the feed time offset. This translates into the pressure that has gotten closest to (or gone farthest past) the setpoint. An offset deadband is available in the logic.
Every cycle in step 12, a feed time adjustment is calculated:

feedtime gain×offset=feedtime adjustment

EXAMPLE

Top offset Bed A=0.5 Top offset Bed B=0.3
Bottom offset Bed A=0.25 Bottom offset Bed B=0.3
feedtime gain×offset=feedtime adjustment 1000×(0.5 psia*Correction Factor)=+0.3 s
***Note: The Correction Factor is internal to the program logic and is used to convert the pressure value to a more manageable value with respect to the control logic.
This adjustment can be positive or negative depending on the offset. The adjustment calculated is not allowed to exceed ½ second (+ or −).

If either bed pressure reaches the feed unload pressure setpoint or the vacuum alarm setpoint, the above calculation is ignored and the feed time is reduced by the maximum adjustment (½ sec). This time reduction can happen in any half cycle. Maximum and minimum feed time limits keep the automatic adjustments from reaching unrealistic values.

Reflux Autotuning

The reflux offset is calculated by subtracting the largest (in magnitude) of the two bottom offsets from the largest (in magnitude) of the two top offsets for the purge and equalization steps (reflux steps).

Every sixth cycle in step 12, purge and equalization time adjustments are calculated:

purge gain×offset=purge time adjustment

−1×equalization gain×offset=equalization time adjustment

EXAMPLE

Top offset Bed A=0.35 Top offset Bed B=0.2
Bottom offset Bed A=0.2; Bottom offset Bed B=0.15

0.35−0.2=0.15 (Reflux Offset)

purge gain×offset=purge time adjustment

1000×(0.15 psia*Correction Factor)=+0.1 s

−1×equalization gain×offset=equalization time adjustment

−1×1000×(0.15 psia*Correction Factor)=−0.1 s

These adjustments can also be positive or negative and are limited to + or −½ second. Maximum and minimum limits are provided for purge and equalization times.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A pressure swing adsorption (PSA) method for removing a preferred gas from a gas mixture, said method performed by at least a first adsorbent bed and a second adsorbent bed operating over plural cycles, each cycle comprising plural steps wherein each bed proceeds through both adsorption and desorption actions, said method comprising the steps of:
  a) monitoring, in a cycle, a maximum feed pressure to each said bed of said gas mixture during adsorption therein;
  b) monitoring, in a cycle, a minimum evacuation pressure from each said bed of said gas mixture during desorption therefrom; and
  c) altering individual step times within a cycle, in accord with pressures monitored in steps a) and b), to control flows to and between said first adsorbent bed and second adsorbent bed in order to optimize and achieve maximum production.

2. The method as recited in claim 1, wherein step c) controls an equalization step time during which flow occurs between said first adsorbent bed and second adsorbent bed.

3. The method as recited in claim 1, wherein step c) further adjusts purge and overlap equalization step times.

4. The method as recited in claim 1, wherein step c) maintains said maximum feed pressure and minimum evacuation pressure within determined set points, substantially independently, by selective adjustment of step times that influence each said pressure.

5. The method as recited in claim 4, wherein said maximum feed pressure is about 23 psia and said minimum evacuation pressure is about 6 psia.

6. The method as recited in claim 1, wherein step c) lowers feed pressure and evacuation pressure by an increase in equalization step time and a decrease in purge step time.

7. The method as recited in claim 1, wherein step c) raises feed pressure and evacuation pressure by a decrease in equalization step time and an increase in purge step time.

8. The method as recited in claim 1, wherein each said bed is fed by pressurizing pump means and evacuated by vacuum pump means, and wherein said pressurizing pump means operates at pressures in excess of atmospheric pressure and said vacuum pump means operates at pressures below atmospheric pressure.

9. The method as recited in claim 1, wherein said preferred gas is oxygen.

10. A pressure swing adsorption (PSA) method for removing a preferred gas from a gas mixture, said method performed by at least a first adsorbent bed and a second adsorbent bed operating over plural cycles, each cycle comprising plural steps wherein each bed proceeds through both adsorption and desorption actions, said method comprising the steps of:

a) monitoring at any time during a cycle, a minimum concentration of said preferred gas in effluents from both of said beds; and b) in an event of a sensed imbalance in said minimum concentration between said effluents, adjusting equalization flows between said beds to achieve a balance of monitored minimum concentrations.

11. The method as recited in claim 10, wherein step b) adjusts said equalization flows while maintaining step times unchanged.

12. The method as recited in claim 10, wherein said preferred gas is oxygen.

13. A pressure swing adsorption (PSA) method for removing a preferred gas from a gas mixture, said method performed by an adsorbent bed operating over plural cycles, each cycle comprising plural steps wherein said bed proceeds through both adsorption and desorption actions, said bed fed by pressurizing pump means and evacuated by vacuum pump means, said method comprising the steps of:

a) monitoring, in a cycle, a maximum feed pressure to said bed of said gas mixture during adsorption therein;

b) monitoring, in a cycle, a minimum evacuation pressure from said bed of said gas mixture during desorption therefrom;

c) altering individual step times within a cycle, in accord with pressures monitored in steps a) and b), to control flows to and from said adsorbent bed in order to optimize and achieve maximum production.

14. The method as recited in claim 13, wherein step c) controls maximum feed pressure and minimum evacuation pressure substantially independently by selective adjustment of step times that influence each said pressure.

15. The method as recited in claim 11, wherein said preferred gas is oxygen.

16. A pressure swing adsorption (PSA) method for removing a preferred gas from a gas mixture, said method performed by at least a first adsorbent bed and a second adsorbent bed operating over plural cycles, each cycle comprising plural steps wherein each bed proceeds through both adsorption and desorption actions, said method comprising the steps of:

a) monitoring, in a cycle, a maximum feed pressure to each said bed of said gas mixture during adsorption therein;

b) monitoring, in a cycle, a minimum evacuation pressure from each said bed of said gas mixture during desorption therefrom;

c) altering individual step times within a cycle, in accord with pressures monitored in steps a) and b), to control flows to and between said first adsorbent bed and second adsorbent bed;

d) monitoring at any time during a cycle, a minimum concentration of said preferred gas in effluents from both of said beds; and e) in an event of a sensed imbalance in said minimum concentration between said effluents, adjusting equalization flows between said beds to achieve a balance of monitored minimum concentrations.

17. The method as recited in claim 16, wherein step c) controls an equalization step time during which flow occurs between said first adsorbent bed and second adsorbent bed.

18. The method as recited in claim 16, wherein step c) further adjusts purge and overlap equalization step times.

19. The method as recited in claim 16, wherein step c) maintains said maximum feed pressure and minimum evacuation pressure within determined set points, substantially independently, by selective adjustment of step times that influence each said pressure.

20. The method as recited in claim 16, wherein step e) adjusts said equalization flows while maintaining step times unchanged.

21. The method as recited in claim 16, wherein said preferred gas is oxygen.

* * * * *